US008141125B2

(12) United States Patent
Maes

(10) Patent No.: US 8,141,125 B2
(45) Date of Patent: Mar. 20, 2012

(54) ORCHESTRATION OF POLICY ENGINES AND FORMAT TECHNOLOGIES

(75) Inventor: Stephane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 1275 days.

(21) Appl. No.: 11/565,578

(22) Filed: Nov. 30, 2006

(65) Prior Publication Data

US 2007/0150936 A1     Jun. 28, 2007

Related U.S. Application Data

(60) Provisional application No. 60/741,536, filed on Nov. 30, 2005.

(51) Int. Cl.
G06F 21/00     (2006.01)

(52) U.S. Cl. ............. 726/1; 706/45; 706/47; 706/48; 706/54; 706/56; 706/57; 706/58

(58) Field of Classification Search ... 726/1; 706/45–58
See application file for complete search history.

(56) References Cited

U.S. PATENT DOCUMENTS

| | | | |
|---|---|---|---|
| 5,850,517 A | 12/1998 | Verkler et al. | |
| 6,157,941 A | 12/2000 | Verkler et al. | |
| 6,374,305 B1 | 4/2002 | Gupta et al. | |
| 6,424,948 B1 * | 7/2002 | Dong et al. | 705/9 |
| 6,845,452 B1 * | 1/2005 | Roddy et al. | 726/11 |
| 7,171,190 B2 | 1/2007 | Ye et al. | |
| 7,233,935 B1 * | 6/2007 | Chandler | 706/47 |
| 2002/0087678 A1 | 7/2002 | Padilla | |
| 2002/0178122 A1 | 11/2002 | Maes | |
| 2002/0184373 A1 | 12/2002 | Maes | |
| 2002/0194388 A1 | 12/2002 | Boloker et al. | |
| 2002/0198719 A1 | 12/2002 | Gergic et al. | |
| 2002/0198991 A1 | 12/2002 | Gopalakrishnan et al. | |

(Continued)

FOREIGN PATENT DOCUMENTS

WO     WO 2005064429 A1 *     7/2005

OTHER PUBLICATIONS

Fuzzy Set Theory and it appliations by Zimmermann; Year: 2001; Publisher: Kluwer Academic Publishers.*

(Continued)

Primary Examiner — Taghi Arani
Assistant Examiner — Madhuri Herzog
(74) Attorney, Agent, or Firm — Kilpatrick Townsend & Stockton LLP

(57) ABSTRACT

Policies can combine the efficiency of rule sets with the flexible expression power of workflow engines, as well as advantages of other programming languages and engines. Consistent modelling of policy rules is provided across different levels, such as network, control, and service levels. In one system, a policy module can orchestrate rule set and workflow engines in order to evaluate different conditions of a policy. In another embodiment, a hybrid language can be used that allows rule set and other variables to be used in a business process container, workflow and other variables to be used in a rule set container, rule set and business process variables to be used in other containers. In this way, a subset of conditions in a policy can be evaluated using multiple languages and/or engines in order to enforce or evaluate a policy.

28 Claims, 12 Drawing Sheets

U.S. PATENT DOCUMENTS

| | | | |
|---|---|---|---|
| 2003/0023953 | A1 | 1/2003 | Lucassen et al. |
| 2003/0046316 | A1 | 3/2003 | Gergic et al. |
| 2005/0015340 | A1 | 1/2005 | Maes |
| 2005/0021670 | A1 | 1/2005 | Maes |
| 2006/0143686 | A1 | 6/2006 | Maes |
| 2006/0203732 | A1* | 9/2006 | Covino et al. ............ 370/241 |
| 2006/0212574 | A1 | 9/2006 | Maes |
| 2006/0224542 | A1* | 10/2006 | Yalamanchi ............ 706/47 |
| 2006/0272028 | A1 | 11/2006 | Maes |
| 2007/0150936 | A1 | 6/2007 | Maes |
| 2007/0203841 | A1 | 8/2007 | Maes |

OTHER PUBLICATIONS

An Introduction to the Web Services Policy Language by Anderson; Publisher: IEE; Date: Jun. 2004.*

Representing Web Service Policies in OWL-DL by Kolovski et al; Publisher: Springer-Verlag; Year: 2005.*

Andrews, T. et al., "Business Process Execution Language for Web Services, Version 1.1," May 5, 2003, 31 pages.

Liberty Alliance Project, "Liberty Architecture Overview Version 1.1," Liberty Alliance Project: Piscataway, New Jersey, Jan. 15, 2003, 44 pages.

Maes, S. et al., "Multi-Modal Browser Architecture, Overview on the Support of Multi-Modal Browsers in 3GPP," located at <http://www/w3.org, last visited on May 26, 2003, 25 pages.

Maes, S., "Multi-Modal Web IBM Position W3C/WAP Workshop," located at <http://www.w3.org>, last visited on May 26, 2003, 9 pages.

Netscape.com, "Planning and Deploying a Single Sign-On Solution, Introduction to Single Sign-On," Netscape 6 Documentation Training Manual, located at <http://developer.netscape.com/docs/manuals/security/SSO/sso.htm, last visited on May 26, 2003, 5 pages.

Sundsted, T.E., "With Liberty and Single Sign-On for All, The Liberty Alliance Project Seeks to Solve the Current Online Identity Crisis," 2003, located at <http://www.javaworld.com/javaworld/jw-02-2002/jw-0215-liberty.html>, last visited on May 26, 2003, 7 pages.

The Parlay Group: Parlay X Working Group, Parlay APIs 4.0, Parlay X Web Services White Paper Version 1.0, 2002, 12 pages.

Tom Sheldon's Linktionary™.com, "Policy-Based Management," 2001, located at <http://www.lintionary.com/p/policy.html>, last visited on Aug. 3, 2004, 4 pages.

* cited by examiner

ORCHESTRATION OF POLICY ENGINES AND FORMAT TECHNOLOGIES

CLAIM OF PRIORITY

This application claims priority to U.S. Provisional Patent Application No. 60/741,536, filed Nov. 30, 2005, which is hereby incorporated herein by reference.

CROSS REFERENCES TO RELATED APPLICATIONS

This application contains material related to commonly-assigned U.S. patent application Ser. No. 10/855,999 (US2005/0015340), entitled "Method and apparatus for supporting service enablers via service request handholding"; U.S. patent application Ser. No. 10/856,588, (US20050021670), entitled "Method and Apparatus for Supporting Service Enablers Via Service Request Composition"; and U.S. patent application Ser. No. 11/024,160, entitled "Policies as Workflows", filed Dec. 27, 2004; each of which are hereby incorporated herein by reference.

BACKGROUND OF THE INVENTION

Embodiments in accordance with the present invention generally relate to serving requests, and handling messages and resource access, for industries such as the telecommunications industry, using technologies such as Web services, SIP, Java® (a registered trademark of Sun Microsystems, Inc., of Santa Clara, Calif.), and Corba® (a registered trademark of Object Management Group, Inc., of Needham, Mass.) and more specifically to processing rules, policies, and/or workflows in these technologies.

Policies, typically combinations of selected policy rules, are used for a variety of purposes. For instance, policies are used to authorize or authenticate a user, enforce service level agreements, charge for access or usage, allocate resources, and determine which services a subscriber or user is allowed to access, including privacy policies, usage policies, preferences, etc. Such policies are used, for example, by telecommunication companies, wireless service enablers, Internet service providers (ISPs), information technology (IT) vendors, network equipment vendors, and application developers.

Policies typically include a combination of conditions and actions. In existing service provider networks, policies typically are evaluated or enforced using a rule set language. Rule set languages are typically optimized for the specific application for which they are used, and as such are extremely efficient for use in evaluation of policies, such as in the evaluation phase of a Policy Decision Points (PDP)/Policy Enforcement Points (PEP) model. Rule set models are also relatively simple to implement, manage, and optimize. A potential drawback to the use of rule set models, however, is that the typical implementation of a policy as a rule set is rather restrictive in functionality, such as in an extensible Access Control Markup Language (XACML) implementation. In fact, a rule set typically only supports the evaluation of a first condition, followed by the execution of a single action (or a limited number of actions associated with a different condition). This does not provide the desired combination of any condition with any action. There is a limited ability to develop rich and flexible expressions, such as topology of a programmable flow between the rule sets with loops, conditions, and actions that may affect the flow.

Such simple implementation or topologies may be suitable for some network level decisions (e.g., for switches) that tend to not require complex procedures, but instead require high speed and/or efficiency. Currently, some flexible expressions are required in control level policies, such as IP Multimedia Sub-System (IMS) policies, which mix low latency requirements with the need for some expression power. At a higher level of need for expression power are service level policies, such as execution environment policies and enabler/service exposure policies, which may occur in Web services, for example. Another example includes policies that support the flows of a content delivery suite, such as are described in U.S. patent application Ser. No. 11/138,844, entitled "PLATFORM AND SERVICE FOR MANAGEMENT AND MULTI-CHANNEL DELIVERY OF MULTI-TYPES OF CONTENTS", filed May 25, 2005, and U.S. patent application Ser. No. 11/357,652, entitled "SERVICE LEVEL DIGITAL RIGHTS MANAGEMENT SUPPORT IN A MULTI-CONTENT AGGREGATION AND DELIVERY SYSTEM," filed Feb. 16, 2006, each of which is hereby incorporated herein by reference.

As described in U.S. patent application Ser. No. 11/024,160, incorporated by reference above, for example, policies may also be implemented as workflows in a business process modeling language (BPML), such as BPEL (Business Process Execution Language). Policies with business rules may be manually integrated into a BPEL process by adding activities, which model the consumption and production of messages, tasks, data, or goods. However, the manual integration of rules is inefficient, and it is not easy for the developer to handle complex rules and deal with the impact of dynamically changing rules. As such, BPEL is well suited for modeling delegation and complex combinations of business processes, but has limitations in implementing policies Further, while the requirements on policy evaluation and enforcement may differ for each policy level, consistency across these policy levels is essential. The same policy, or parts thereof, may exist on each level, such as on network/transport, session control and/or signaling, and service levels. For example, as one expands the service level (layer) for service providers, more and more functions previously provided in the lower layer may also partially or totally be provided in the service level (e.g. service level charging). It is therefore essential to consistently model policy rules across levels (e.g. to avoid double/multiple charging or to ensure consistent charging/charging correlation across levels). Consistent policy rules and engines also are needed for provisioning resulting policies in the service provider domain and in service-oriented architecture (SOA) to separate business rules and consistently model composition of resources.

Existing systems fall short of various goals behind policy enforcement, including: (1) provide a single enabler and set of interfaces to manage all service provider policies (at least at the service level) and move away from silos; (2) provide formalism to author/manage policies throughout a service provider domain; (3) assure interoperability across vendors; (4) assure interoperability across actors (e.g. letting an enterprise or third party content or service provider delegate some policy evaluation and enforcement steps to the service provider, letting an authorized principal load/send/configure policies on a terminal); (5) stabilize/rationalize (i.e., allow evolutionary approaches, migration, etc.) the policy management, evaluation and enforcement and the policy modeling across any evolution of the SP domain (e.g., evolving/changing vendors, evolving/changing network/resource technologies, evolving/changing policy needs, evolving/changing or new services with different policy implications, etc); (6)

facilitate the development of policy authoring tools and development, deployment and management environment; and (7) facilitate the reuse of a common policy formalism for enablers/resources/services and other standard bodies.

Other drawbacks of existing implementations of policies include: limitations of the combination of conditions of actions that can be achieved; limitation of the scope to too narrow domain; limitations of the extensibility (e.g. what kind of condition or action can be expressed); portability; interoperability; modeling and support of delegation; implementation complexities; impact on legacy systems and deployed solutions; implications for policies already specified by resources; and impact of implementation reuse.

BRIEF SUMMARY OF THE INVENTION

Systems and methods in accordance with various embodiments of the present invention combine the efficiency of rule sets with the flexible expression power of workflows, business process modeling languages, and other languages or engines for implementing, evaluating, and enforcing policies. Embodiments provide consistent modelling of policy rules across different levels, such as across network, control, and service levels.

In one embodiment, policy evaluation and/or enforcement is accomplished by first determining at least one policy to be applied to a received input, such as a request, message, packet, or other source of information. For purposes of simplicity, many of the examples discussed herein will refer to a request, such as a request for a target resource from a user, third party, or application, but it should be understood that this is merely exemplary and that a policy can be applied to any source, message, request, or other item as known in the art. In one example, a policy model includes various conditions and actions, allowing any of a number of different paths through the model, topology, or policy graph to be followed depending upon the evaluation of the conditions, execution of actions, and portions of the policy graph contained therein. Each path can include a subset of the conditions, actions, and policy graph for the entire policy. Further, the conditions and actions in the various paths can be evaluated and/or executed using any combination of rule sets, workflows, business process modeling languages, and other such code, engines, or languages.

Such a policy can involve several different execution models and languages, which can effectively merge the execution and enforcement engines and environments, as well as the combination of multiple languages. Embodiments therefore can provide for the orchestration and merging of multiple engines and execution environments. Embodiments also can merge different languages and provide common tools based on the merging of development and management tools. The merging of languages and combining of tool functionality allows for the combination and/or merging of different policy portions into a single policy, and can allow different policies to be expressed differently within a single framework.

In one example, a hybrid language allows rule set and BPML variables, as well as other programming scripts, programs, language, or engines in general, to be used to process conditions, execute actions, etc. In another example, a hybrid engine or other policy module is operable to orchestrate the flow of a policy evaluation or enforcement by passing control and variables between a rule set engine or language model, a business process language engine or language model, and any other appropriate languages, engines, and/or models. In one embodiment, a rule set container controls the application of a policy utilizing process language variables, and a process language container can control the application of a policy utilizing rule set variables. This also can be the case for other programs and/or scripts. A policy module also can be operable to optimize a topology of the complex policy and/or pre-compile at least a portion of the policy in order to increase efficiency.

For each condition evaluated in a policy, such a policy model can provide for a combination of at least one workflow or business process modeling language, at least one rule set language, and any other appropriate language, model portion, or engine to be used to evaluate the policy. The application of the policy in a case where it is desirable to optimize efficiency can utilize a subset of the conditions and actions in a way that maximizes efficiency through use of rule sets where possible, but capitalizes on the flexibility of workflows, business process modeling, or other appropriate languages. In other cases, it may be desirable to exploit the flexibility or ease or delegation to workflows or business process languages by utilizing a subset of conditions and actions that maximizes flexibility through use of flow or process languages where possible. Other resources can be used for the delegation of various functions of the policy evaluation and/or enforcement where appropriate. In a callable mode, a response can be sent when a result is determined. In a proxy mode, the proxy would act by passing along or re-directing the input message or request, or bouncing back the message in the case of an error, etc.

A system for applying policies as described above can include a request module for receiving or intercepting messages, requests, or other inputs and determining at least one policy to be applied and executed. A policy module can include a workflow engine and a rule set engine, as well as any other appropriate engine, language, or managements tools useful for evaluating conditions, executing actions, processing sub-graphs, etc. Such engines can be separate engines or portions of a larger hybrid engine. A policy module also can provide the ability to delegate to a number of resources to perform some of the processing steps. The policy module can operate in proxy mode, such as where a request is sent to a target and is intercepted, whereby a policy can be applied, evaluated, and enforced in order to determine whether the request goes true or not. The policy also can operate in a callable mode for which there is no target, and a request, message, or other input results in the initiation of policy evaluation and/or enforcement, with results being returned and/or actions being performed as a result of the evaluation and enforcement.

As a policy can include various conditions and actions, control and values can be passed back and forth between a workflow or business process language or engine, a rule set language or engine, and any other appropriate engine, language, or management tool in order to evaluate conditions, execute actions, and process sub-graphs as desired in the path through the policy corresponding to the request to process the policy. A combination of workflow or business process languages, engines, or tools; rule set languages, engines, or tools; and any other appropriate languages, engines, or tools then can be used to evaluate each policy. The languages can be separate language portions, part of a hybrid language, or portions or variables of a language embedded or otherwise accessible in another language. The policy module then can take the appropriate action based on the corresponding policy and mode.

Other embodiments will be obvious to one of ordinary skill in the art in light of the description and figures contained herein.

BRIEF DESCRIPTION OF THE DRAWINGS

Various embodiments in accordance with the present invention will be described with reference to the drawings, in which.

DETAILED DESCRIPTION OF THE INVENTION

Figure 1:
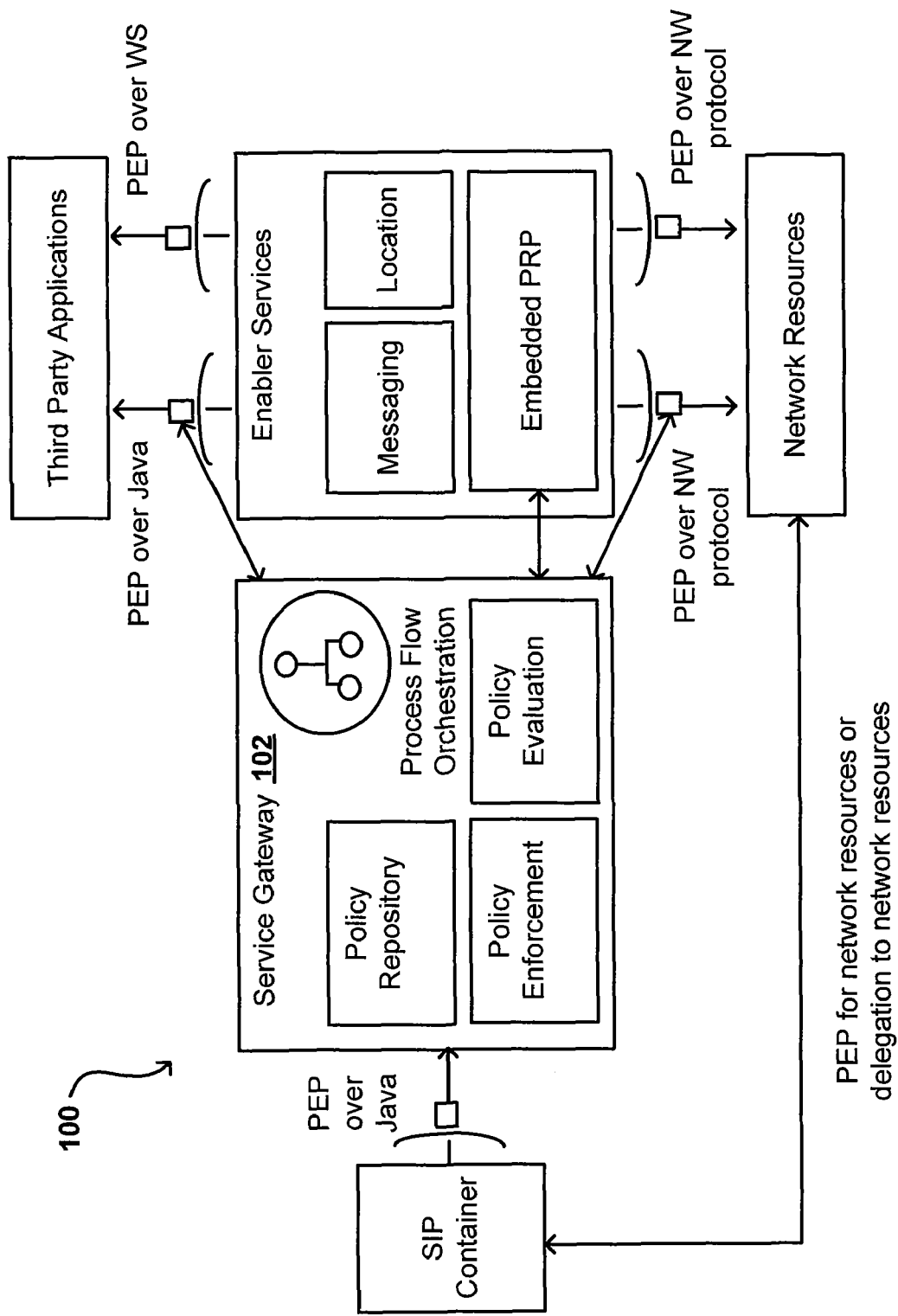
FIG. 1 illustrates the use of a service gateway in accordance with one embodiment of the present invention.

Systems and methods in accordance with various embodiments of the present invention can overcome the aforementioned and other deficiencies in existing policy evaluation and enforcement systems by providing a uniform platform for handling the evaluation and enforcement of policies across disparate systems and levels. In one embodiment, multiple engines and/or execution environments can be orchestrated to evaluate and enforce portions of a policy, such as to increase the efficiency or flexibility of the evaluation. In another embodiment, a common language can be provided to represent policies, allowing for the mixing and/or co-existence of multiple languages, such as flow and rule set languages. These embodiments can thus provide a common framework and/or management environment for policies. The policies then can be modeled with one framework, using a combination of languages and/or engines, and viewed using a single tool. And engine used for evaluating a policy also can delegate and drive, or otherwise orchestrate, other engines in order to evaluate the policy.

An example of such a model is illustrated by the following, which is meant to be exemplary for purposes of explanation and not viewed as a limitation on the various embodiments. A service delivery platform (SDP) is used in this example that provides policy evaluation and enforcement using a service gateway (SCW) (following the IETF PDP/PEP model). A SGW can be used in proxy mode (i.e., as a Gateway) whereby the SGW intercepts all messages across the service provider service layer. Using such an approach allows for factorization of business rules from enablers and services. Enablers or services provide only intrinsic functions (e.g., messaging), while the service providers can set policies for security, charging, SLAs, logging, QoS, privacy, etc., that are enforced at the level of the SGW. Such an approach also facilitates the exposure of the service provider's assets to a third party, as enabling a third party amounts solely to assigning an appropriate policy to the associated business agreements. It also significantly shortens the time needed to customize or deploy a service by facilitating reuse and reducing the steps required for regulatory compliance.

A SGW can also be used in callable mode as a PDP (Policy Decision Point) that can be invoked by any PEP (Policy Enforcement Point) in the SDP or in the operator's domain. Such an approach can provide a common mechanism to manage all policies in the service provider domain as well as a central repository for policies.

Typical policies address security, charging, logging, auditing, quality of service (including throttling, prioritized routing, etc.), privacy, and preferences. Policies can be further customized to enforce any additional clause of interest to the service provider, thus behaving as a full orchestration engine. A SGW in one example can rely on a flow language such as BPEL, Web Service management, and rule engines. Policies are expressible as a combination of BPEL flows, rule sets, and other scripts, and policies can be authored and/or managed with corresponding tools. A SGW can support local (e.g. Java) and WS bindings, for example, as well as other protocols with protocol specific interceptors.

The SGW in this example is central to the exposure of enablers and applications to third parties. When a third party subscribes or is authorized to access a resource in the operator's network, a policy is associated therewith. This can be done by the service provider domain administrator or automated via a self service portal or later from the service provider's BSS. The policies then can reflect the associates SLAs or business agreement. Interfaces exposed to third parties can be modified by the policies. The resulting interfaces are communicated to, or discovered by, the third party (e.g., application catalog, UDDI, etc.) Any message from and to the third party is subject to policy evaluation and enforcement. This is consistent with the I0/I0+P model of the Open Security Exchange (OSE). The SGW then enforces or delegates enforcement of the different steps. Policies can similarly be associated to subscribers' requests. Such use of the SGW can be described with respect to the arrangement 100 of FIG. 1, useful for telecommunications applications, for example.

In this example, interceptors that request policy evaluation and enforcement can take place within the service layer, such as at the edge of the service provider domain (at the service layer), within the service provider domain, or as called by services or enablers. Interceptors also can take place at the edge between the service layer and the underlying network layers (including the session control layer when the layer explicitly exists), or within the network layer. The SGW 102 can provide tools to author, manage, evaluate, and enforce all these policies if so desired by the service provider. In such a case, the network level PEP can use the SGW as a PDP, and/or the policies can call network level resources for evaluation or enforcement of the policies.

When deployed on a TISPAN (Telecommunications and Internet Serivces and Protocol for Advanced Networking) IMS, for example, processing a policy can involve delegating steps that call a Resource Admission Control Subsystem (RACS). Conversely, an RACS deployment may be implemented such that it calls SGW for PDP steps (with RACS behaving as a PEP). These details illustrate the differences and advantages of using SGW with RACS. A main advantage is the possibility to consolidate in one location all the policy management functions. This is an optional use, and if a service provider does not wish to do so, the SGW can be limited to policy evaluation and enforcement at the service layer level and at the edge of the service layer (the third party and toward the network layers). The same argument may be extended to many other network policies (IMS or others—e.g. Parlay/OSA).

Such cases of common models and/or orchestration of engines are provided by various embodiments in accordance with the present invention. Embodiments can combine flow languages, rule sets, and other languages or engines, for example, to provide for the evaluation and execution of policy rules, the efficient evaluation and execution of conditions and actions, and the utilization of business flows between multiple policies. An abstract policy expression language can be used to model and author policies, "orchestrate" policy engines and technologies, and/or be converted at authoring, upload, or execution into an executable policy. Such an abstract language can reuse existing concepts and/or specifications as appropriate.

In one embodiment, rule set and/or flow models are used that allow for any combination of conditions and actions. Programmable flows and topologies can be handled that are much more complex than are used in existing systems, including features such as loops, programmable flows, and bifurcations, while retaining the efficiency of rule set engines and providing for ease maintenance, such as by providing the ability to dynamically change rules in a business process or workflow.

As mentioned above, and as used herein a policy refers to an ordered combination of policy rules that defines how to administer, manage, and control access to resources. A policy contains a combination of conditions and actions, with a condition being any expression that yields a Boolean value and an action (e.g., invocation of a function, script, code, workflow) being associated with a policy condition in a policy rule. An action is executed when its associated policy condition results in "true" from the policy evaluation step. The process of executing actions, which may be performed as a consequence of the output of the policy evaluation process or during the policy evaluation process, is referred to as policy enforcement. The process of evaluating the policy conditions and executing the associated policy actions up to the point that the end of the policy is reached is referred to as policy evaluation. Policy management refers to the act of describing, creating, updating, deleting, provisioning, and viewing policies. Policy processing refers to policy evaluation or policy evaluation and enforcement A policy rule is a combination of a condition and actions to be performed if the condition is true.

While policies can include any combination of rules, including any combination of conditions and actions, a policy workflow typically refers to the expression of a series of conditions, actions, rules, and/or policies to be executed. For example, workflows or business processes may describe sequences in which rules are executed, or how conditions may be combined with actions to enforce the one or more policies on a communication. The concept of using policies as workflows is described in further detail in U.S. patent applications Ser. No. 10/855,999, Ser. No. 10/856,588, and Ser. No. 11/024,160, which are incorporated by reference above. A workflow or business process includes a logical combination of one or more conditions to be satisfied and one or more actions to be executed to enforce or evaluate the one or more policies. In this manner, complex, hybrid, and/or merged topologies are possible.

Figure 2:
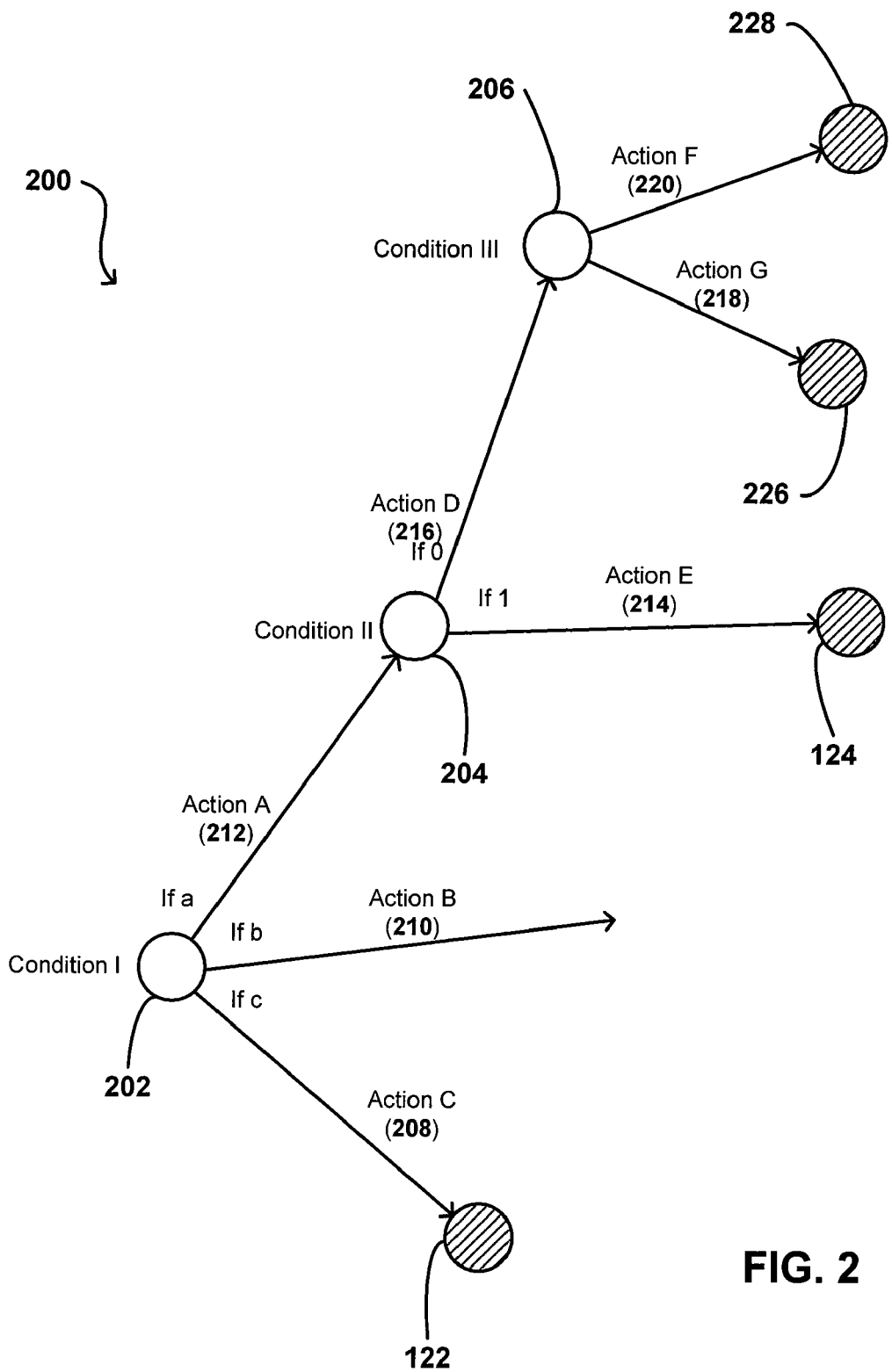
FIG. 2 illustrates a topology graph for implementation of at least one policy in accordance with one embodiment of the present invention.

FIG. 2 illustrates an example of a topology graph 200 that describes the topology of a policy composed of multiple policy rules according to one embodiment of the present invention. Each node (e.g., 202, 204, 206) represents a condition to be evaluated. Each branch (e.g., 208, 210, 212) extending from a node represents an action to be executed based on the value of the condition of the node from which that branch extends. The nodes can represent simple or complex conditions to be evaluated. Actions associated with branches followed from a condition node can include, for example, the allowance or denial of permission to access a resource, or the evaluation of additional conditions based on the result of previous conditions. In this manner, an action may pass a value, attribute, content, or other result to the next condition to be evaluated. The action further can involve manipulating any of the data before passing the value to the next selected condition. There are no significant limitations to these actions, and the actions can impact context as well as variables, and can also terminate a path along the policy graph, such as action 208. Other nodes or termination points (e.g., 222, 224, 226) correspond to the termination of the policy enforcement, which can lead to the returning of a result (e.g., an authorization decision) or the enforcing of a decision for a communication or transaction. In an alternative embodiment, the nodes in the graph can correspond to entire rules or policies, each of which can have topology like that of FIG. 2.

In this particular example, condition I is evaluated at a first node 202. Note that the numbering of nodes as first, second, and third is for clarity only, and is not meant to imply a necessary order of occurrence along a policy path. Depending on the state (e.g., "a", "b", or "c") of condition I, actions A, B, or C are executed, as the condition will result in the following of one of branches 208, 210, and 212. Action C indicates a termination of the enforcement policy at end point 222. Action B is left un-terminated in the graph, as it may lead to other conditions, logic, or termination of the policy enforcement. Action A leads to the evaluation of condition II at node 204. If condition II evaluates to '1', action E is taken along branch 214 and the policy terminates at termination point 224. If condition II evaluates to '0', action D is taken along branch 216 and the policy moves on to evaluate condition III at node 206. Similar actions can be seen for branches 218 and 220, and termination points 226 and 228.

As illustrated with respect to the flow of FIG. 2, not all rules and/or policies will be evaluated for a given request. This is different from existing technologies such as the use of declarative rule sets, for example, which typically require each rule to be evaluated. In the present example, control is sent from a first rule, condition, or policy to a second rule, condition, or policy, and so on, depending on the result of the first rule, condition, or policy. Accordingly, a final result of a policy can depend on the exact order and selection of rules that are evaluated. Such an approach provides for the implementation of more complex rules, actions, and policies that in existing systems.

Even though systems in accordance with various embodiments can combine the functionality of rule set and workflow or business process evaluation, and allow for complex topologies, the programmable flow and individual rule sets can be considered separately in order to provide for efficient calculation of conditions in a unified framework. In order to consider these functionalities separately, for example, the topology can be re-arranged to equivalent topologies, for example, or a policy can be pre-compiled and/or hard coded. In another embodiment, policy enforcement can be accomplished through parallelization and compensation, such as by reverting a parallel path that was followed by mistake in order to parallelize the enforcement.

As mentioned above, the programmable flow and the individual rule sets can be considered separately. Considering node 206 and actions 218 and 220 of FIG. 2, for example, the node 206 could represent an evaluation only policy, wherein condition III is evaluated and under branch 218 a TRUE value is returned from node 226. Under branch 220, a FALSE value is returned from node 228.

Under topology re-arrangement, however, condition III may be re-used with different actions. The topology of the policy graph can be changed in numerous ways without changing the result of the evaluation or enforcement. Condition III can be evaluated at node 206, and from branch 218 a result "A" is returned instead of a TRUE value. Under branch 220, a result "B" is returned instead of a FALSE value. This is equivalent to keeping the condition of one topology and changing the actions. The re-use of a condition or actions may be accomplished such as by the following description.

A condition or an action can have a unique identifier so that it can be re-used wherever needed. In this manner, a condition can be coded only once and thus easily maintained. A flow language such as BPEL can be used to describe any combination of conditions and actions. Conditions and actions then can be expressed as rule set(s) as defined in the Internet Engineering Task Force (IETF) common policy draft with an expected execution model. Similarly, conditions and actions can be expressed as rule sets in XACML (the eXtensible Access Control Markup Language), for example. The interaction between the rule set(s) and the flow language can be supported in part by the variables in the rule set(s) being flow language variables, for example, or conversely flow language variables being variables in the rule sets. Using such an approach, any condition or action can embed rule sets with variables that are shared with a corresponding flow language, and/or can embed workflows with variables that are shared with a corresponding rule set. In one embodiment, combinations of conditions and actions are supported with a declarative rule set language by integrating rule sets in a programmatic Turing complete flow language. In other embodiments, existing policy languages can be extended to support, for example, Web Services for Management (WS-management), orchestration, choreography, and/or workflows.

Figure 3:
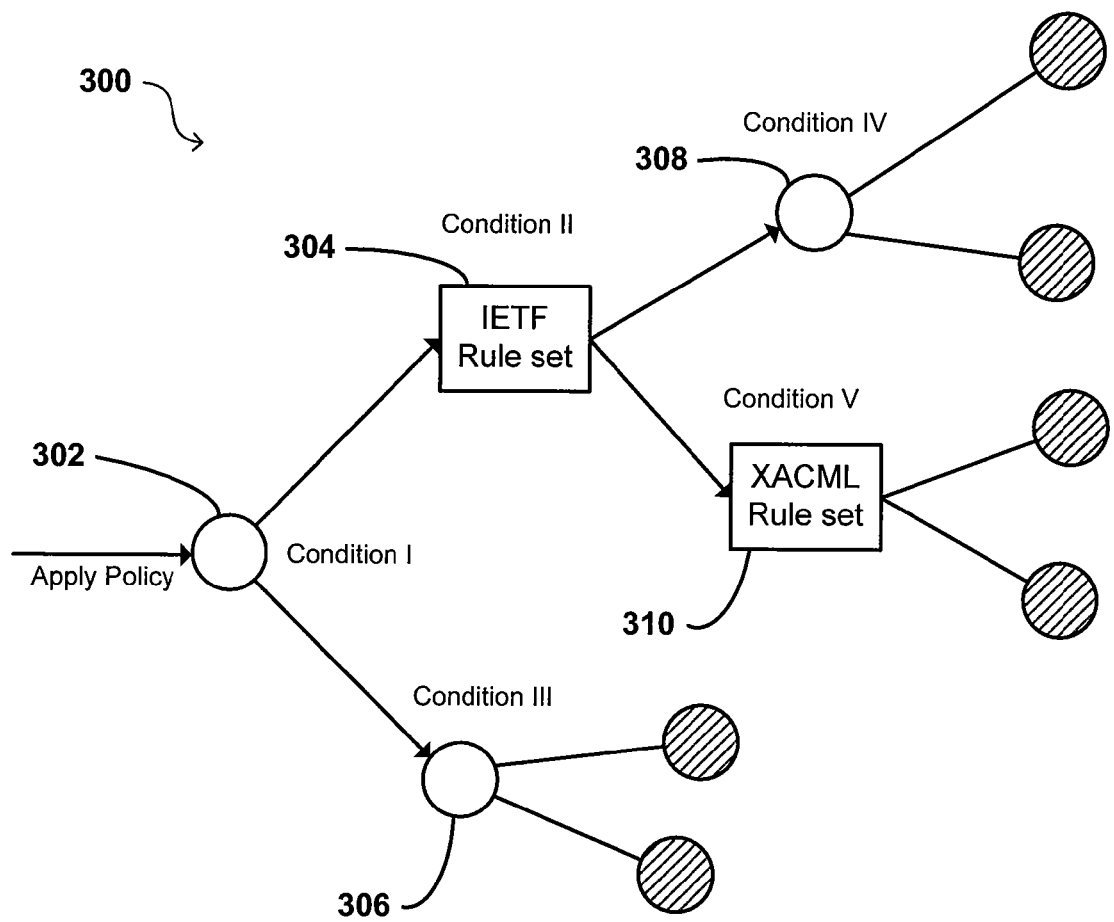
FIG. 3 illustrates a complex topology graph wherein rule sets are accessed in a workflow container in accordance with one embodiment of the present invention.

FIG. 3 illustrates an exemplary topology graph 300 that can be used to implement a policy using rules sets and workflows in accordance with one embodiment. In this graph, the circular nodes represent part of a workflow or business process language execution model, while the rectangular nodes represent rule sets used in the workflow/business process model. It should be understood that other languages and engines can be used at various nodes in the topology as well as described elsewhere herein.

In the graph, a policy is applied to a request by evaluating a first condition (condition I) at a first workflow node 302. This can occur in a flow language engine or a hybrid engine, for example, such as is described in greater detail below. The action corresponding to node 302 can result in condition II being evaluated at node 304 in a rule set language. This is accomplished in one embodiment by calling a rule set engine and passing flow variables from the workflow engine to the rule set engine. In one embodiment, the rule set language is based on the IETF common policy draft or XACML. Alternatively, condition III can be evaluated at node 306 within the workflow engine. The policy then can terminate on the branches from node 306.

If the policy path reaches node 304, the result from the rule set language can be passed to a workflow engine, which can include the logic to determine the next branch and/or action to take based on the result from the rule set engine. The action may include evaluating condition IV in the workflow engine at node 308, for example, or passing control and variables to the rule set engine to evaluate condition V at node 310. The policy thus may terminate within the rule set language, within the workflow engine, or within any other suitable environment as would be apparent to one of ordinary skill in the art in light of the teachings and suggestions contained herein.

As rules can have a unique rule identifier, rule sets and policies also can be extended to have similar identifiers. Thus, any combination or topology of rules and policies can be formed, with variables being shared in a like manner. Any rule set language(s) then can coexist with any workflow language(s). Further, any Turing complete language can be used as the workflow language, including C, C++, Java, C#, Ecmascript, and other suitable languages. Rule sets, such as declarative rule sets, can be considered as equivalent to VoiceXML forms (with rules equivalent to fields) in VoiceXML and algorithms like the FIA (form Interpretation algorithm) to return the result.

Figure 4:
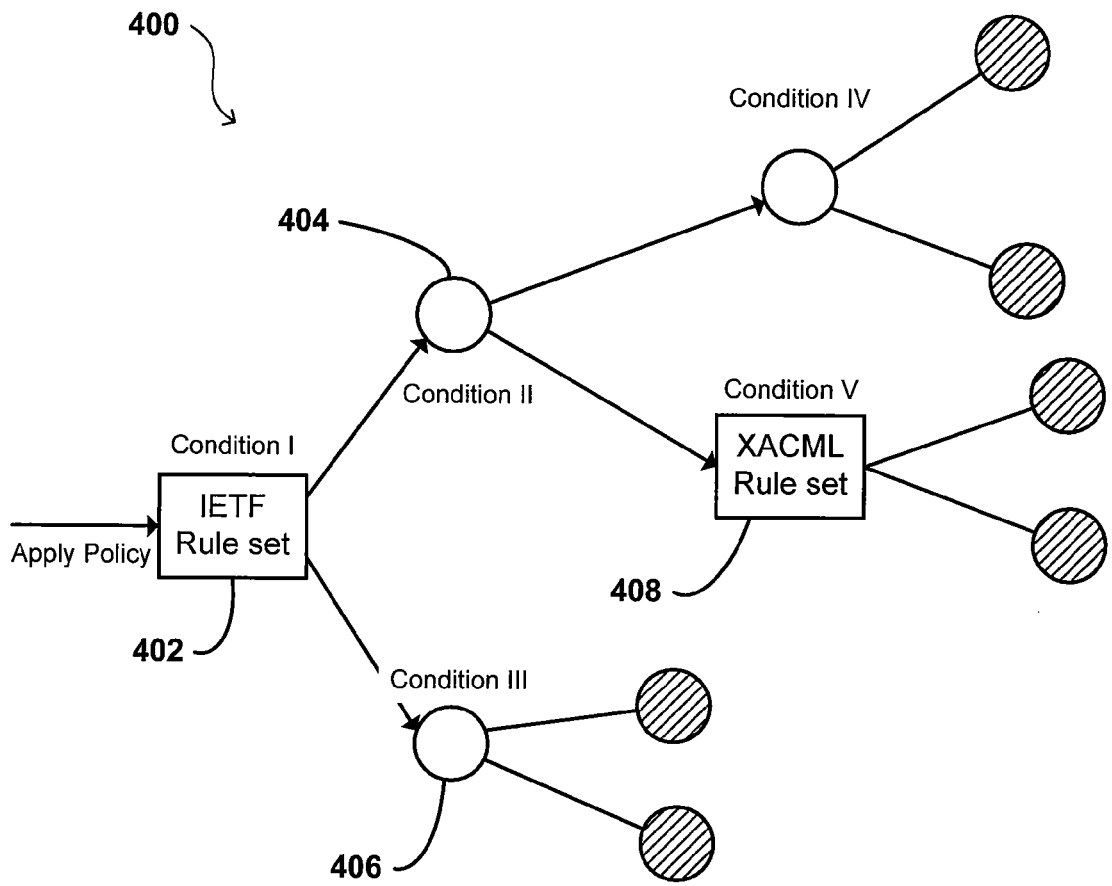
FIG. 4 illustrates a complex topology graph wherein workflows are accessed in a rule set container in accordance with one embodiment of the present invention.

Using a policy flow similar to that of FIG. 3, a policy can be applied as in the topology graph of FIG. 4 to a request by evaluating a first condition (condition I) at a first rule set node 402. This can occur in a rule set engine or a hybrid engine, as described below. The action corresponding to node 402 can result in condition II or condition III being evaluated at node 404 or 406, respectively, in a workflow language. This is accomplished in one embodiment by calling a workflow engine and passing variables from the rule set engine to the workflow engine. From node 404, the evaluation of condition II can result in condition IV being evaluated within the workflow engine, or condition V being evaluated in a rule set engine at node 408, either in the same or a different rule set engine as was used with condition I. In this way, a workflow, business process, or other languages, engines, or topologies can be embedded in a rule set container.

Figure 5A:
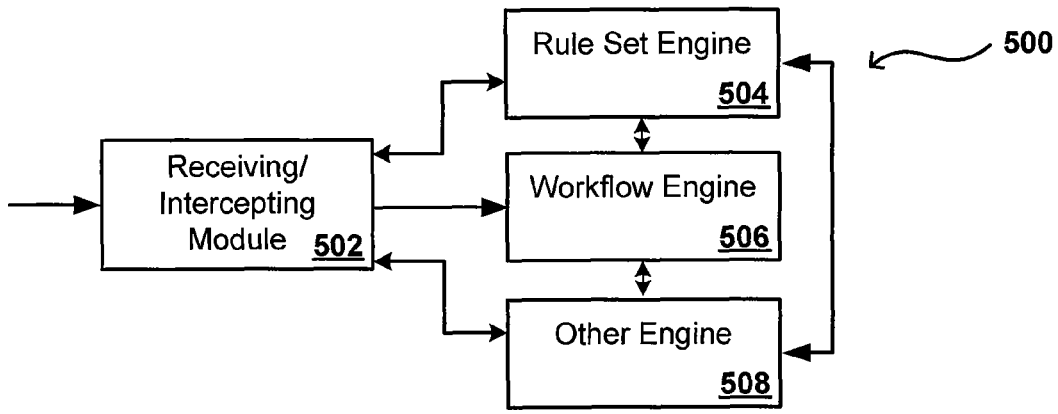
FIGS. 5(a)-5(e) illustrate various combinations of a receiving module, rule set engine, and workflow engine that can be used to implement complex policies in accordance with one embodiment of the present invention.

As mentioned above, the flow languages and rule sets can be accessed and processed using at least one workflow engine and at least one rule set engine, respectively, or can utilize at least one hybrid engine incorporating both rule set and workflow functionality, as well as any other appropriate languages, processes, or functionality. For example, FIG. 5(a) illustrates a system 500 in accordance with one embodiment wherein a message is received, such as from a user, third party, or application. This message can be any appropriate input, such as a request to a callable policy evaluation and enforcement or as a message that is intercepted and starts the evaluation process as input, as discussed elsewhere herein. A receiving and/or intercepting module 402 receives (or intercepts) the message, and is operable to associate at least one policy with the message based on at least one property or content of the message. In another embodiment, the receiving module receives the message but another part of the system associates one or more policies with the request. Once the message is received by the receiving module and at least one policy is applied, the receiving module can direct the evaluation of the policy to a rule set engine 404, a workflow engine 406, or any other appropriate engine 408 based on the model or topology of the one or more policies being applied. For example, a declarative rule set engine can be selected to evaluate at least part of a first rule to form a first result as prescribed in any of the embodiments described herein. The first result then can be sent to another node in the rule set engine to evaluate at least part of a second rule, to another rule set engine to evaluate at least part of a second rule, or to a workflow, business process, or other appropriate engine that can perform a logic operation on the first result. The rule set engine(s), workflow engine(s), and other appropriate engines can pass control, variables, values, and/or other information back and forth during the application of the policy until a result is obtained.

Figure 5B:
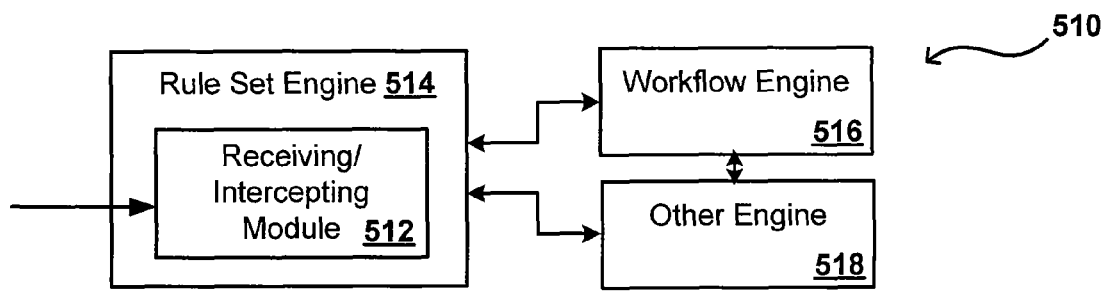
Figure 5C:
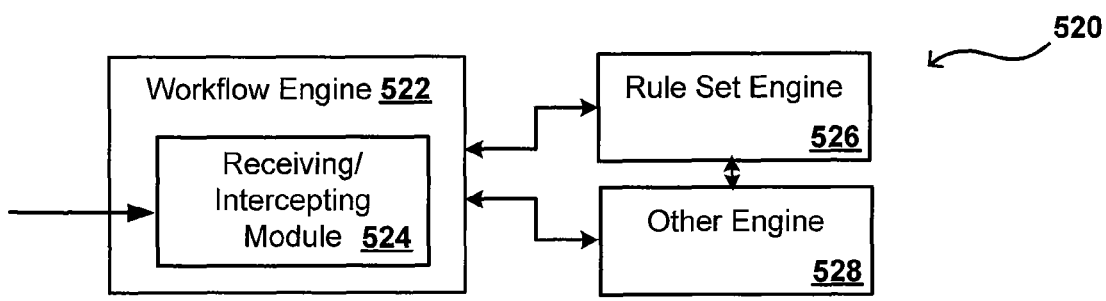

FIG. 5(b) illustrates a system 510 according to an embodiment wherein a receiving or intercepting module 512 is part of, or at least associated with, a rule set engine 514. In this manner, initial control is set in a rule set language, and information, control, and other variables can be passed between the rule set engine 514, a workflow engine 516, and any other appropriate engine 518 as necessary to process policies. It also should be understood that the receiving/intercepting module 524 could alternatively be contained within, or at least associated with, a workflow engine 522, as in the system 520 of FIG. 5(c), such that the initial control is set in a flow language such as BPEL, and control, information, and variables can be passed to a rule set engine 526 or other appropriate engine 528 as necessary or desired.

Figure 5D:
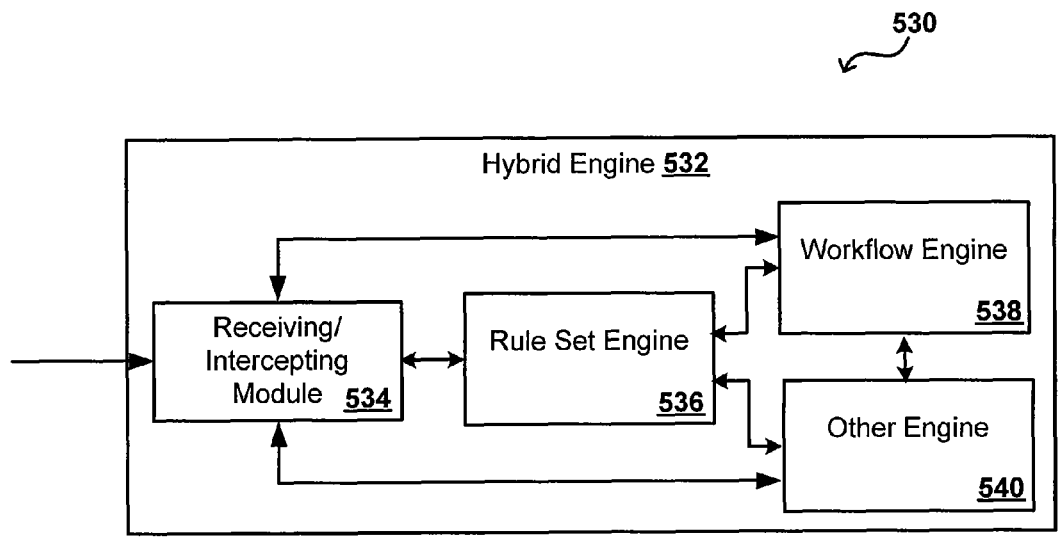
Figure 5E:
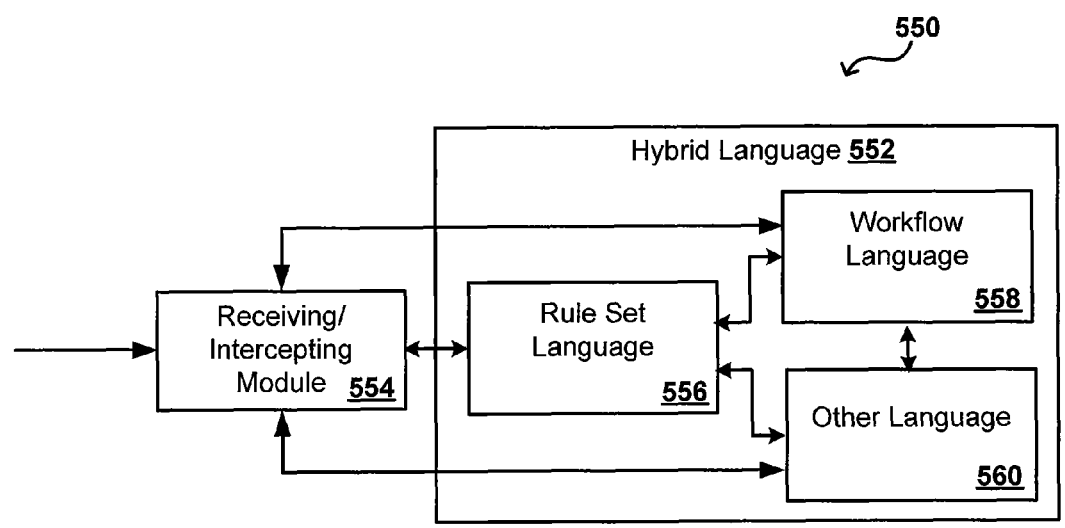

FIG. 5(d) illustrates a system 530 in accordance with another embodiment, wherein a receiving/intercepting module 534, at least one rule set engine 536, at least one workflow engine 538, and any other appropriate engine 540 are contained within, or at least associated with, a hybrid engine 532. In this manner, control can be set in a hybrid language, or set in any of these engines, and context can be switched between modules and/or engines as needed, such as is determined by a policy topology. It also should be noted that the receiving/intercepting module can alternatively be located outside, or separate from, the hybrid engine.

Similarly, 5(e) illustrates a system 550 in accordance with another embodiment, wherein at least one rule set language 556, at least one workflow language 558, and any other appropriate language 560 are contained within, or at least associated with, a hybrid language 552. In this manner, control can be set in a hybrid language, or set in either language, and context can be switched between modules and/or engines as needed, such as is determined by a policy topology. It also should be noted that a receiving/intercepting module 554 can be inside, outside, or separate from the hybrid language.

By allowing flows, rule sets, and other languages or engines to be accessed during enforcement and/or evaluation of a policy, it is possible to orchestrate different policy engines. For example, when a workflow engine initiates control and acts as a container for the policy evaluation, it is possible to select from different rule set or other engines to efficiently evaluate and/or enforce a policy. Conversely, when a rule set engine acts as the container, the rule set(s) for the engine can delegate and orchestrate workflows as necessary, passing values and control to appropriate workflow engines as needed.

This approach can be further extended beyond workflows and rule sets. In the same way in which workflows and rule sets can be incorporated as described above, any other code, algorithms, modules, programs, languages, etc., can be combined with business processes, workflows, rule sets, etc., as combinations of conditions and actions in a policy topology. Just as workflows, business processes, and other languages can be incorporated into rule sets, and rule sets can be incorporated into workflows or business processes, for the purposes of evaluating and enforcing policies (and any other appropriate action), any appropriate code can be used as the container language, such as for the hybrid engine or for a separate engine, which can direct the flow to the appropriate workflow or rule set engine as necessary.

Exemplary Policy Enforcement

While policies can be used at any appropriate level in a system or network as known in the art, policies are widely used at the network level. When policies are used at the network level, a commonly used method of policy enforcement is the IETF PEP/PDP approach, referred to herein as a callable mode. PDP/PEP is a particular case of a callable mode of policy evaluation and enforcement, wherein a Policy Enforcement Point (PEP) makes a request to a Policy Decision Point (PDP) to perform an evaluation of a policy.

In the PDP/PEP case of a callable mode, policies are stored on servers (the PDPs) and are enforced on clients (PEPs). One example of a policy client (PEP) is an RSVP router that exercises policy-based admission control over RSVP usage. The RSVP protocol employs a client/server model wherein the PEP sends requests, updates, and deletes to the remote PDP, and the PDP returns decisions or results back to the PEP based on at least one policy.

In callable mode, a policy enforcer can be called by a resource to perform policy evaluation and enforcement, such as where a policy enforcer is used to delegate the policy evaluation and/or enforcement task. When it makes sense (e.g. within a trusted domain, with a trusted requestor), the resource that delegates policy enforcement can also pass the policy to enforce with the request (e.g., a policy file or a link (URI) to the policy).

Figure 6:
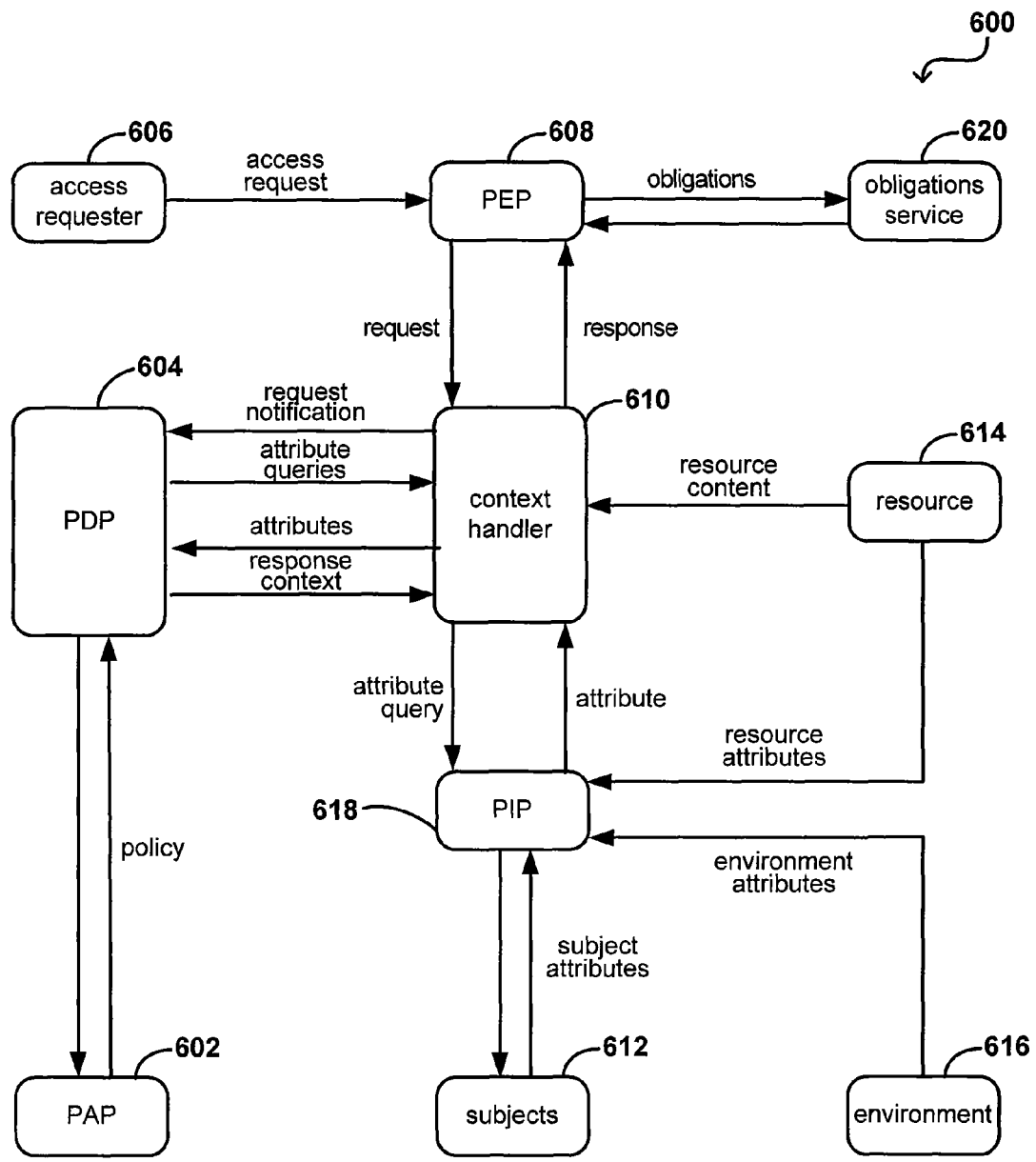
FIG. 6 illustrates an exemplary model that can be used to implement complex policies in accordance with one embodiment of the present invention.

FIG. 6 shows an example of a direct PDP/PEP model 600 that will be described with respect to XACML, which in one embodiment can be used with the engines and modules discussed above to evaluate and/or enforce policies. In this system, a Policy Administration Point (PAP) 602 can be used to generate policies and policy sets, and make the policies and policy sets available to a PDP 604. These policies and/or policy sets can represent a complete policy for a specified target resource. An access requestor 606 can send a request for access to a PEP 608, which can in turn sends a request for access to a context handler 610. The request can be send in the native format of the initial request, and may include attributes relating to subjects 612, resources 614, actions, conditions, and the policy environment 616. The context handler 610 can construct a request context, in this example an XACML request context, and can send the context to the PDP 604. The PDP 604 can request any additional subject, resource, action, condition, and environment attributes from the context handler 610.

The context handler can request the attributes from a Policy Information Point (PIP) 618, which obtains the requested attributes and returns the requested attributes to the context handler 610. Optionally, the context handler can include the resource 614 in the context. The context handler 610 sends the requested attributes and, optionally, the resource to the PDP 604, which evaluates and/or enforces the policy. As discussed above, the PDP can include at least one workflow engine, rule set engine, or hybrid engine for evaluating or enforcing a policy. In an alternative embodiment, the PDP server does not include any of these engines, but instead is operable to route requests and/or information to engines located elsewhere in the system or across the network as would be apparent to one of ordinary skill in the art.

After evaluating and/or enforcing the policy in accordance with at least one of the embodiments described above incorporating workflows, rule sets, and/or other code, the PDP 604 returns the response context (including an authorization decision, for example) to the context handler 610. The context handler then translates the response context to the native response format of the PEP 608, and sends the response to the PEP. Upon receiving the response, the PEP 608 can communicate with an obligation service 620 to fulfill any obligations for the policy. If access is permitted in this example, then the PEP 608 permits the requester 606 access to the resource. If access is not permitted per the policy, access to the resource is denied to the requestor.

When using a callable mode for policy evaluation and/or enforcement, it is also possible to delegate the evaluation and/or enforcement. For example, FIG. 7(*a*) shows a system 700 wherein a policy evaluation and enforcement module 704, which may include components such as are described with respect to FIG. 6, is configured to receive requests for a resource 702 from a requestor 706, such as a user, third party, application, or other module. In this case, the policy module acts as a proxy, intercepting the request and deciding whether to pass a request onto the target resource based on evaluation and/or enforcement of at least one appropriate policy. In order to apply a policy to the request, the policy module 704 can delegate at least a portion of the evaluation and/or enforcement, such as by calling a workflow engine or rule set engine that carries out the processing of conditions and actions for the policy. Upon reaching a terminating point in the flow, for example, the separate engine can return the result to the policy module 704, which can generate a response to send to the requester 706, send a request to the target resource if access is granted, continue processing the remainder of the request, or delegate another portion of the evaluation and/or enforcement to another module, such as another workflow engine or rule set engine. Various engines and modules, such as rule set engines, workflow engines, and other appropriate code portions, are designated in the figure by Resources 1-3 708, 710, 712. The use of such a proxy mode helps to protect and minimize exchanges between requestors and resources, ensuring that only authorized requests, for example, pass to a resource. In this mode, a policy enforcer module can be seen as an orchestrator, choreographer, workflow engine, rule set engine, or hybrid engine.

Figure 7A:
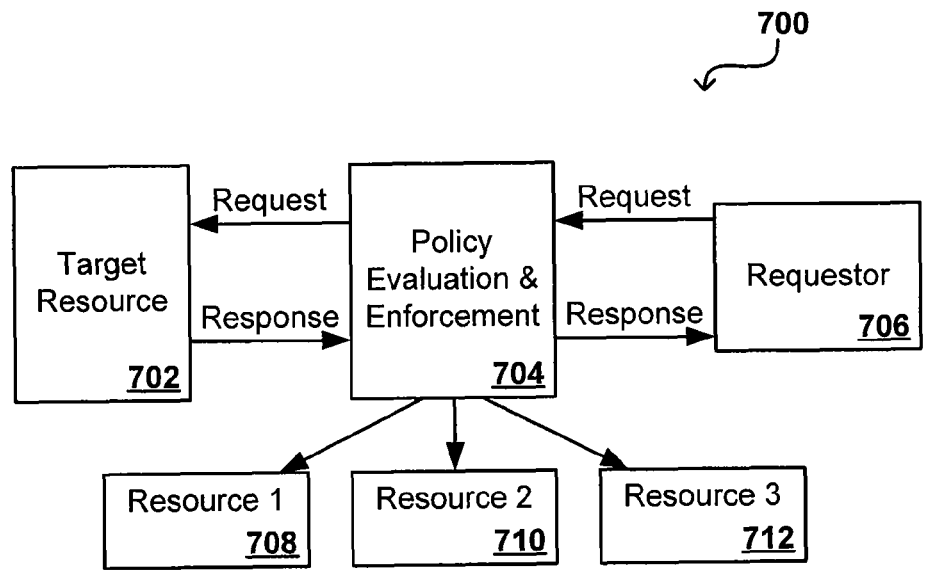
FIGS. 7(a) and 7(b) illustrate components of proxy and callable implementations that can be used in accordance with one embodiment of the present invention.
Figure 7B:
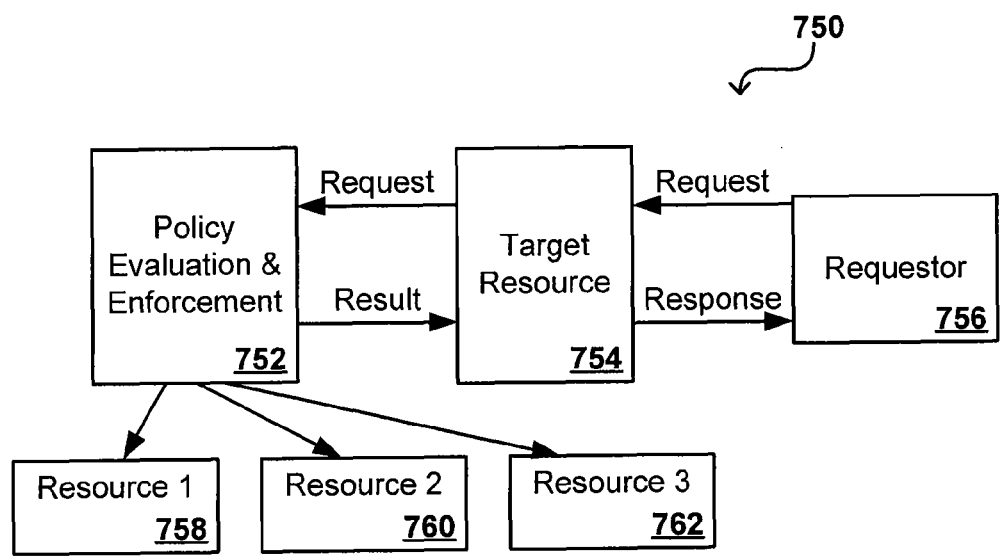

FIG. 7(*b*) shows an implementation wherein the requests from the requestor 756 are received directly by the target resource 754, which then can send a request for policy evaluation and/or enforcement to an appropriate policy module 752 before responding to the requestor. Again, the policy module 752 (which of course can include several modules or components as described elsewhere herein) can delegate at least a portion of the evaluation and/or enforcement to various resources 758, 760, 762. After finishing the evaluation and/or enforcement, the policy module can return a result to the target resource 754, which can send an appropriate response to the requester based on the result. Systems can support either or both of the implementations of FIGS. 7(*a*) and 7(*b*), by allowing either or both of a policy module and a target resource to receive requests from a requester. The proxy and callable modes then both can be implemented, without necessarily restricting the callable mode implementation to policy evaluation, for example.

In all cases, and particularly in proxy mode, it can be desirable to optimize the efficiency of policy enforcement and evaluation. In one example, policy tree graphs or topology can be reorganized based on a cost function or other appropriate algorithm. Branches of a policy tree graph that are commonly followed may be pre-compiled in order to reduce processing time. Any other code can be pre-compiled or executed where that code does not require customization and/or cannot be customized via a workflow. Many other workflow optimization techniques also can be utilized as known in the art.

Such optimizations then can result in embodiments that consist of a mix of, for example: (1) rule set constructs including programmatic functions to support the expression of conditions and actions (i.e. rules), and pre-set or programmable rule combination algorithms; (2) programmatic functions and constructs to support expression of any flows, expression of any conditions and any action, and expression of pre-set or programmable rule and rule set combination algorithms; and (3) ways to express service provider specific rules (conditions or actions).

In one embodiment, a policy expression language (PEL) can be supported using a rule set engine, where the PEL is converted into a rule set or a combination of rule sets with an appropriate rule set language (e.g., COMMONPOL/geopriv, XACML). A PEL also can be supported by a workflow or business process engine by being converted into a flow language (e.g., BPEL or JBoss jBPM). Alternatively, a hybrid engine can use PEL as a hybrid language (e.g., a base language with escape mechanisms, having context sharing, from one mode to the other mode. A PEL engine also can be used that directly processes the PEL language without a priori assumptions that some aspects are rule set based or workflow based. A PEL also can be implemented by tools to design and manage the policies.

Embodiments also can allow persons such as developers, service providers, or vendors to solely support rule sets or workflows using a hybrid system. Tools or engines can be provided that can limit the policy expressability to rule sets, and vice versa. At the same time, these persons can use the same set of interfaces and/or tools to manage and author policies and rule sets.

As mentioned above, an abstract policy expression language (PEL) can be used to model and author policies, as well as to "orchestrate" policy engines and technologies. A PEL usage model could be a management and modeling tool by analogy to UML or TMF eTOM flows that tools can use to generate optimized policies expressed in a (set of) target policy expression language(s). The selected PEL also can be appropriately executed by policy enforcer implementations or compiled and/or interpreted into specialized languages executed by dedicated engines. The latter case is where the policy enforcer may be implemented via drivers/adapters to the technology specific engines by these specialized engines. The former case may directly process the PEL language, or can be used to "orchestrate" different policy engines.

A PEL language able to simultaneously model rule sets, workflow and business processes, and generic programming language approaches to expressing policies may include, for example: (1) Data types and data structures/objects and ways to define operations that can be applied to them; (2) Constants, variable data types and ways to define operations that can be applied to them; (3) I/O objects and functions with particular cases of above dedicated to I/O support; (4) Logical, mathematical functions with particular cases of operations that can be applied on data structures; (5) Program flows (e.g., if . . . THEN . . . ELSE, CASE OF, GOTO, FOR . . . LOOP, etc.); (6) A pre-built rule set construct with rules that consist of conditions expressed with the language above, actions expressed with the language above that are executed if the conditions are satisfied, and with a (few) pre-set or a programmable rule combination algorithm(s) that can then be expressed with the language above.

Figure 8:
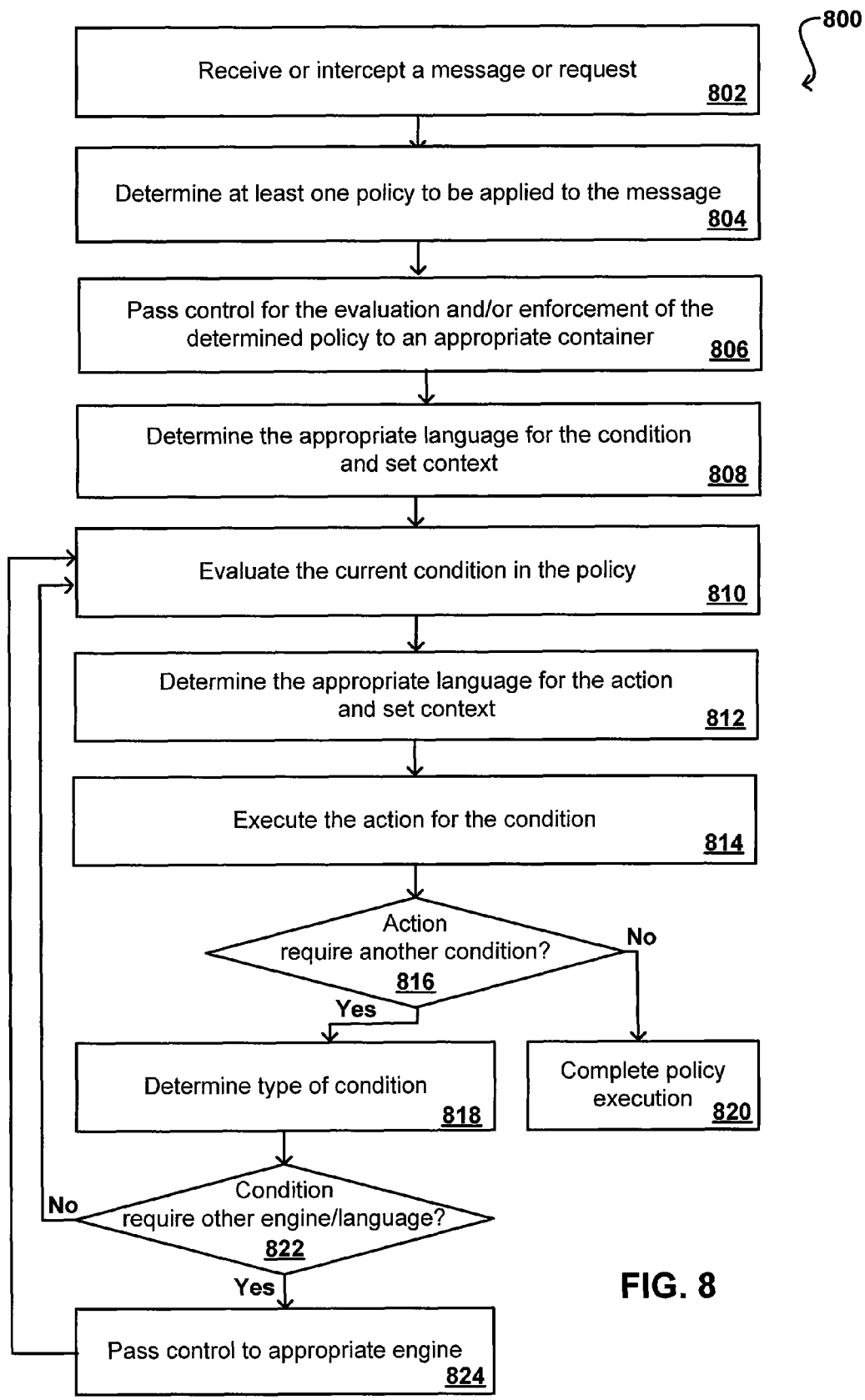
FIG. 8 illustrates an exemplary method in accordance with one embodiment of the present invention.

FIG. 8 is a flowchart showing steps of an exemplary method 800 for evaluating and/or enforcing a policy in accordance with one embodiment of the present invention. It should be understood that this method is merely exemplary, and that many other methods can be used as described or suggested elsewhere herein and as would be apparent to one of ordinary skill in the art in light of the teachings and suggestions contained herein. In the method, a request or message is received or intercepted 802. This message can be any appropriate message, such as a request for access or to set a permission, received from any appropriate party such as a user, third party, or application. The message can be received by any appropriate module or component as discussed elsewhere herein, such as a requested resource, a receiving module, or a policy module. Upon receiving or intercepting the message, at least one policy is determined to be applied to the message 804. This policy (or policies) can be a hybrid policy that utilizes a combination of workflow, rule set, and any other appropriate code to allow for complex decisioning in an efficient and/or flexible manner. The determination of a policy to be applied can depend on any of a number of factors as known in the art, such as the identity of the user, the type of resource requested, and the nature of the request.

After at least one policy is selected to be applied to the message, the evaluation and/or enforcement of the policy is passed to an appropriate container, such as a workflow, rule set, or other appropriate language, which can contain an appropriate model for the policy and can evaluate at least an initial condition in the policy 806. For example, the policy (or policies) might be evaluated with rule set language model, so that control for the evaluation might be passed to a rule set container that has access to a workflow engine or workflow language. Alternatively, a workflow or business process model might be used that has access to rule sets. A determination is made as to the appropriate language to be used to evaluate the condition, and the appropriate context is set 808. The first condition is evaluated in the container 810. After evaluation of the condition, a determination is made as to the appropriate language to be used to execute the action, and the appropriate context is set 812, and the appropriate action is executed 814. The action can be any appropriate action as discussed above, such as the manipulation of data, returning of a value, or the evaluation of another condition. If the action requires the evaluation of another condition 816, then a determination is made as to the type of condition 818. If the condition requires a different engine or language for evaluation 820, the variables and control are passed to the appropriate engine or language component to evaluate the condition 822. Otherwise, control can stay with the current engine or language component. The current action then can be evaluated, and the process can continue until the execution of the policy is complete 824.

Figure 9:
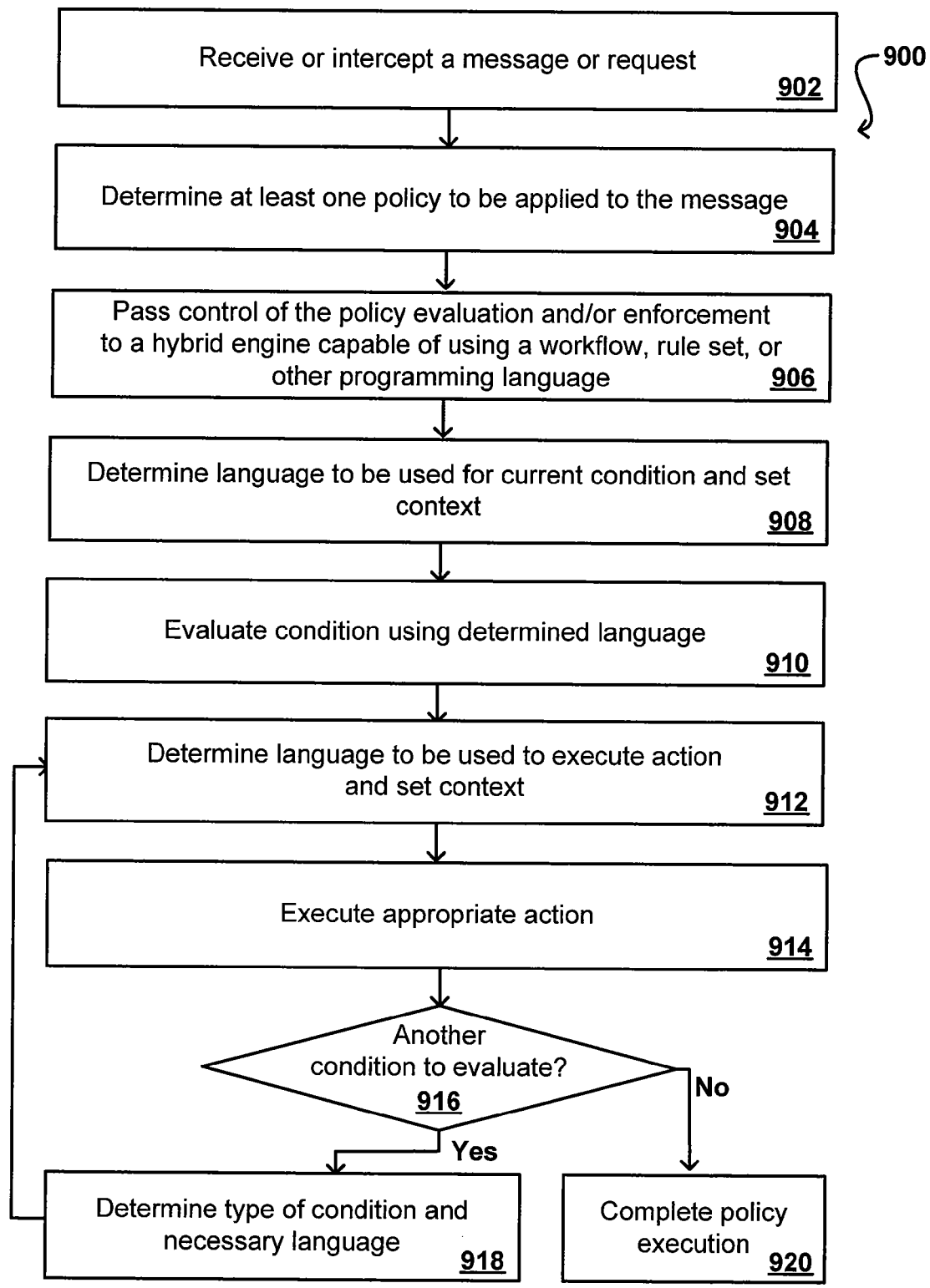
FIG. 9 illustrates another exemplary method in accordance with one embodiment of the present invention.

FIG. 9 is a flowchart showing steps of another exemplary method 900 for applying a policy in accordance with one embodiment of the present invention. In this method, a hybrid engine is used to evaluate policies and conditions using a workflow or process language, a rule set language, and any other appropriate language. A message or request is received or intercepted 902, and a policy is selected to be applied to the message 904. Control of the evaluation or enforcement of the selected policy is passed to a policy module including a hybrid engine capable of evaluating conditions using a workflow language, a rule set language, and any other appropriate language 906. The hybrid engine examines the initial condition and determines the necessary language to be used to evaluate the condition and sets the appropriate context 908. The hybrid engine can pass or retrieve any values for evaluation of the condition using the selected language, where the selected language can include a workflow language, a rule set language, or any other appropriate language. The hybrid engine evaluates the first condition 910. After evaluation of the condition, a determination is made as to the appropriate language to be used to execute the action, and the appropriate context is set 912, and the appropriate action is executed 914. If the action requires the evaluation of another condition 916, then the hybrid engine makes a determination as to the type of condition and necessary language 918. Values can again be passed to the appropriate language for evaluation. The process can continue until the application of the policy is complete 920.

Figure 10:
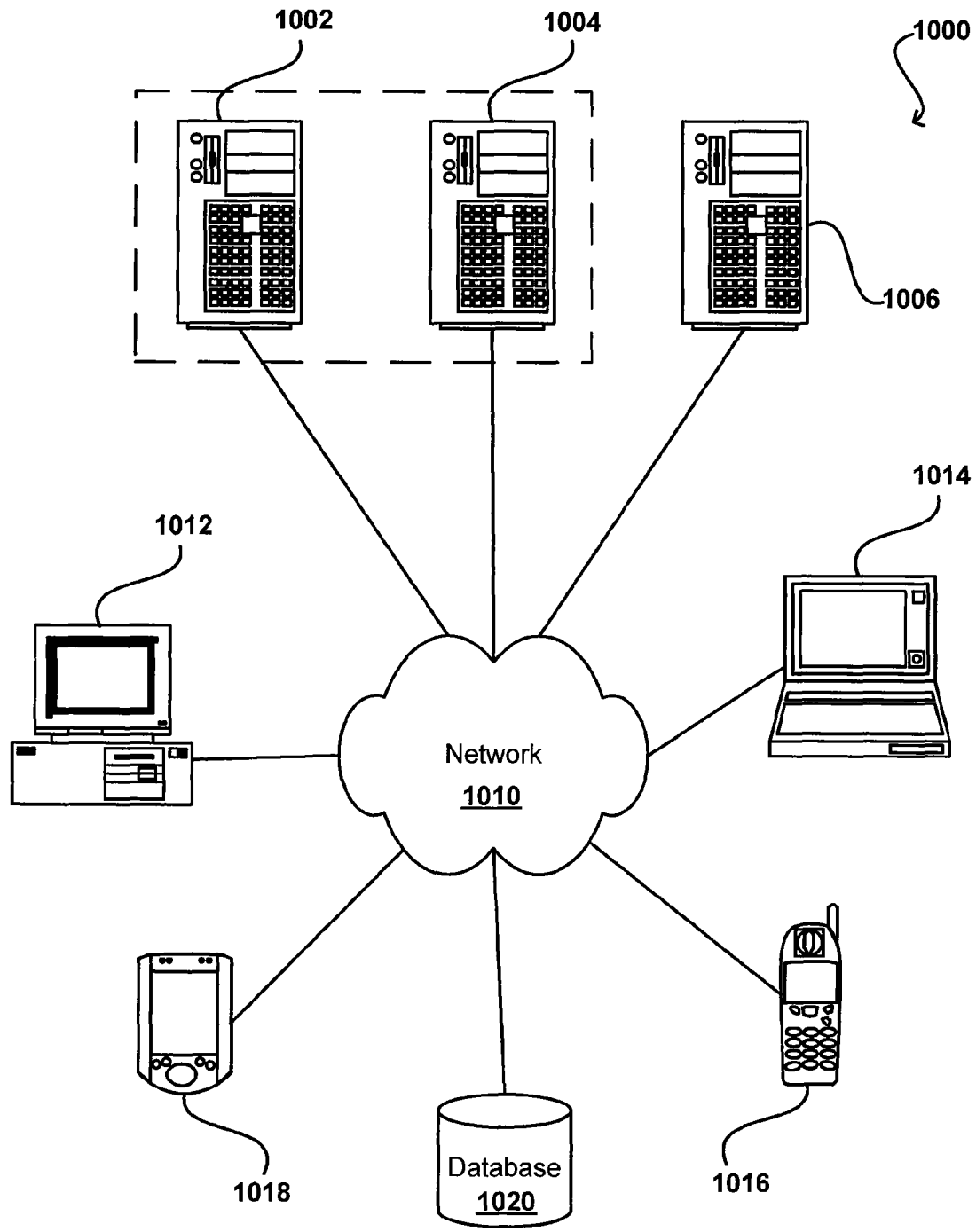
FIG. 10 illustrates components of a computer network that can be used in accordance with one embodiment of the present invention.

FIG. 10 is a block diagram illustrating components of an exemplary operating environment in which various embodiments of the present invention may be implemented. The system 1000 can include one or more user computers, computing devices, or processing devices 1012, 1014, 1016, 1018, which can be used to operate a client, such as a dedicated application, web browser, etc. The user computers 1012, 1014, 1016, 1018 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1012, 1014, 1016, 1018 may also have any of a variety of applications, including one or more development systems, database client and/or server applications, and Web browser applications. Alternatively, the user computers 1012, 1014, 1016, 1018 may be any other electronic device, such as a thin-client computer, Internet-enabled gaming system, and/or personal messaging device, capable of communicating via a network (e.g., the network 1010 described below) and/or displaying and navigating Web pages or other types of electronic documents. Although the exemplary system 1000 is shown with four user computers, any number of user computers may be supported.

In most embodiments, the system 1000 includes some type of network 1010. The network may can be any type of network familiar to those skilled in the art that can support data communications using any of a variety of commercially-available protocols, including without limitation TCP/IP, SNA, IPX, AppleTalk, and the like. Merely by way of example, the network 1010 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1002, 1004, 1006 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1006) may be dedicated to running applications, such as a business application, a Web server, application server, etc. Such servers may be used to process requests from user computers 1012, 1014, 1016, 1018. The applications can also include any number of applications for controlling access to resources of the servers 1002, 1004, 1006.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1012, 1014, 1016, 1018. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1012, 1014, 1016, 1018.

The system 1000 may also include one or more databases 1020. The database(s) 1020 may reside in a variety of locations. By way of example, a database 1020 may reside on a storage medium local to (and/or resident in) one or more of the computers 1002, 1004, 1006, 1012, 1014, 1016, 1018. Alternatively, it may be remote from any or all of the computers 1002, 1004, 1006, 1012, 1014, 1016, 1018, and/or in communication (e.g., via the network 1010) with one or more of these. In a particular set of embodiments, the database 1020 may reside in a storage-area network ("SAN") familiar to those skilled in the art. Similarly, any necessary files for performing the functions attributed to the computers 1002, 1004, 1006, 1012, 1014, 1016, 1018 may be stored locally on the respective computer and/or remotely, as appropriate. In one set of embodiments, the database 1020 may be a relational database, such as Oracle 10 g, that is adapted to store, update, and retrieve data in response to SQL-formatted commands.

Figure 11:
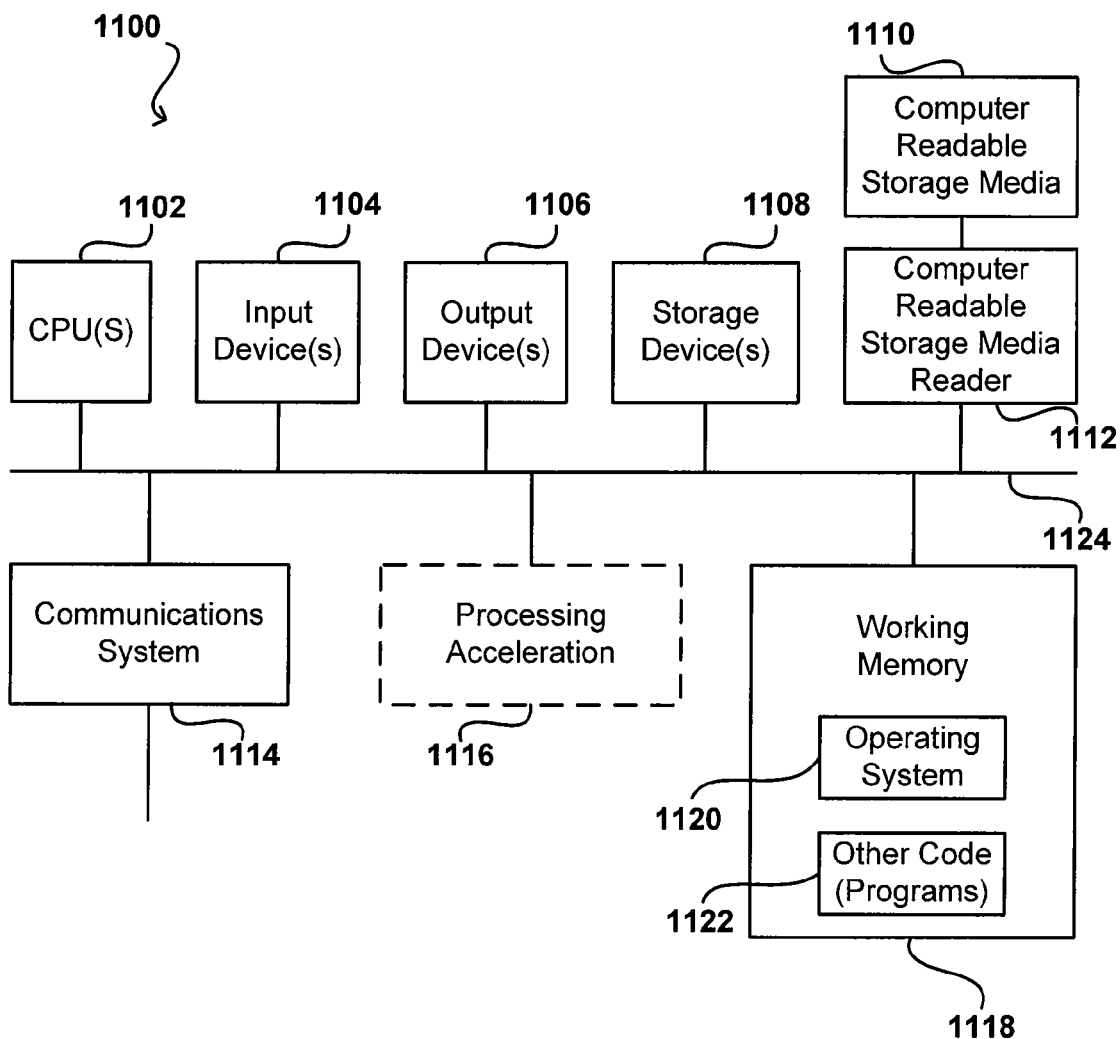
FIG. 11 illustrates components of a computerized device that can be used in accordance with one embodiment of the present invention.

FIG. 11 illustrates an exemplary computer system 1100, in which various embodiments of the present invention may be implemented. The system 1100 may be used to implement any of the computer systems described above. The computer system 1100 is shown comprising hardware elements that may be electrically coupled via a bus 1124. The hardware elements may include one or more central processing units (CPUs) 1102, one or more input devices 1104 (e.g., a mouse, a keyboard, etc.), and one or more output devices 1106 (e.g., a display device, a printer, etc.). The computer system 1100 may also include one or more storage devices 1108. By way of example, the storage device(s) 1108 can include devices such as disk drives, optical storage devices, solid-state storage device such as a random access memory ("RAM") and/or a read-only memory ("ROM"), which can be programmable, flash-updateable and/or the like.

The computer system 1100 may additionally include a computer-readable storage media reader 1112, a communications system 1114 (e.g., a modem, a network card (wireless or wired), an infra-red communication device, etc.), and working memory 1118, which may include RAM and ROM devices as described above. In some embodiments, the computer system 1100 may also include a processing acceleration unit 1116, which can include a digital signal processor DSP, a special-purpose processor, and/or the like.

The computer-readable storage media reader 1112 can further be connected to a computer-readable storage medium 1110, together (and, optionally, in combination with storage device(s) 1108) comprehensively representing remote, local, fixed, and/or removable storage devices plus storage media for temporarily and/or more permanently containing, storing, transmitting, and retrieving computer-readable information. The communications system 1114 may permit data to be exchanged with the network and/or any other computer described above with respect to the system 1100.

The computer system 1100 may also comprise software elements, shown as being currently located within a working memory 1118, including an operating system 1120 and/or other code 1122, such as an application program (which may be a client application, Web browser, mid-tier application, RDBMS, etc.). It should be appreciated that alternate embodiments of a computer system 1100 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of applying a policy to a request, comprising:
   acquiring a request by one of receiving and intercepting the request;
   determining at least one policy to be applied to the request, the at least one policy including a plurality of conditions and a plurality of actions associated therewith;
   based at least in part on the plurality of conditions and the plurality of actions associated with the at least one policy, passing control of evaluation and enforcement of the at least one policy to an associated container, wherein the associated container comprises at least one of: a workflow engine, a rule set engine, or language engine; and
   applying the at least one policy to the request using a common policy model framework implementing the associated container, wherein the common policy model framework is configured to handle the evaluation and the enforcement of the at least one policy across multiple disparate systems by implementing a common language comprising multiple languages, the common policy model framework further being configured such that a determination of an appropriate language and a setting of an appropriate context is done for each condition to be evaluated and each corresponding action to be executed in the at least one policy, the common policy model framework further providing for passing of control and values of the at least one policy for evaluation of a condition and execution of a corresponding action to the determined language, the at least one policy operable to be applied to the request without evaluating each condition and executing each action contained therein;

wherein a combination of at least two of a business process language, a rule set language, and another programming language is used to apply the at least one policy.

2. A method according to claim 1, wherein: applying the at least one policy to the message further includes passing values for one of a condition being evaluated and an action being executed to one of a business process engine, a rule set engine, and another programming language engine.

3. A method according to claim 1, wherein:
the combination of at least two languages is part of a single hybrid language including syntax from the at least two languages.

4. A method according to claim 1, further comprising:
optimizing a topology of the at least one policy.

5. A method according to claim 1, wherein: applying the at least one policy to the message further includes passing control to one of a rule set container having access to business process variables, a business process container having access to rule set variables, and another container having access to rule set and business process variables.

6. A method according to claim 1, wherein: applying the at least one policy to the request further includes following one of a plurality of paths through the at least one policy, each path including at least a subset of the conditions and actions, wherein the followed path is determined in part by the evaluation of the conditions encountered along that path.

7. A method according to claim 1, further comprising:
pre-compiling at least a portion of the at least one policy.

8. A method according to claim 1, wherein: applying the at least one policy includes one of evaluating and enforcing a complex policy.

9. A method according to claim 1, wherein: applying the at least one policy further includes orchestrating at least two policy engines, each policy engine operable to evaluate a condition using a selected language.

10. A method according to claim 1, wherein: applying the at least one policy further includes delegating functions of the evaluation to at least one separate resource.

11. A method according to claim 1, wherein: applying the at least one policy further includes evaluating at least one condition with code separate from the rule set language and workflow language.

12. A method of applying a policy to a request, comprising:
acquiring a request by one of receiving and intercepting the request;
determining at least one policy to be applied to the request, the at least one policy including a plurality of conditions and a plurality of actions associated therewith;
based at least in part on the plurality of conditions and the plurality of actions associated with the at least one policy, passing control of evaluation and enforcement of the at least one policy to an associated container, wherein the associated container comprises at least one of: a workflow engine, a rule set engine, or language engine; and
applying the at least one policy to the request by orchestrating a plurality of programming language engines executing the associated container, wherein the plurality of programming language engines are configured to handle the evaluation and the enforcement of the at least one policy across multiple disparate systems by combining the plurality of programming languages into a common programming language, such that a determination of an appropriate engine is done for each condition to be evaluated and each corresponding action to be executed in the at least one policy, the control and values of the at least one policy for evaluation of a condition and execution of a corresponding action being passed to the determined engine, the at least one policy operable to be applied to the request without evaluating each condition and executing each action contained therein,
wherein a combination of at least two of a business process engine, a rule set engine, and another programming language engine is used to apply the at least one policy.

13. A system for applying a complex policy to a request comprising:
a storage medium having non-transitory sets of computer-readable instructions stored thereon; and
a computer processor coupled to the storage medium, the computer processor configured to execute the sets of instructions in order to perform the following functions:
acquire the request by one of receiving and intercepting the request, and determining at least one policy to apply to the request, the at least one policy including a plurality of conditions and a plurality of actions;
based at least in part on the plurality of conditions and the plurality of actions associated with the at least one policy, pass control of evaluation and enforcement of the at least one policy to an associated container, wherein the associated container comprises a business process language and a rule set language;
apply the at least one policy to the request using a common policy model framework implementing the associated container, wherein the common policy model framework is configured to handle the evaluation and the enforcement of the at least one policy across multiple disparate systems by implementing a common language comprising the business process language and the rule set language;
evaluate a subset of the plurality of conditions in the at least one policy using the business process language; and
evaluate a subset of the plurality of conditions in the at least one policy using the rule set language,
wherein a combination of the business process language and the rule set language is operable to be used to evaluate the at least one policy, the at least one policy operable to be applied without evaluating each condition therein.

14. A system according to claim 13, wherein:
the rule set engine and the business process engine are portions of a hybrid engine.

15. A system according to claim 14, wherein: the hybrid engine is operable to orchestrate the business process engine and rule set engine portions.

16. A system according to claim 14, wherein: the hybrid engine is operable to use a complex language supporting at least rule set and business process variables.

17. A system according to claim 14, wherein: the hybrid engine is operable to optimize a topology of the at least one policy.

18. A system according to claim 14, wherein: the hybrid engine is operable to pass control of the at least one policy to one of a rule set container having access to business process variables and a workflow container having access to rule set variables.

19. A system according to claim 14, wherein: the hybrid engine is operable to apply the at least one policy to the message by following one of a plurality of paths through the at least one policy, each path including at least a subset of the plurality of conditions and plurality of actions, wherein the followed path is determined in part by the evaluation of the subset of the plurality of conditions and execution of the subset of the plurality of actions encountered along that path.

20. A system according to claim 13, further comprising: at least one additional engine operable to evaluate a subset of the plurality of conditions in the at least one policy using an additional language.

21. A system according to claim 20, wherein:
the rule set engine, business process engine, and at least one additional engine are portions of a hybrid engine.

22. A system according to claim 13, wherein: the business process language and the rule set language are part of a hybrid language.

23. A system according to claim 13, further comprising: a target resource corresponding to the request.

24. A system according to claim 22, wherein: the target resource receives the request before the at least one policy is applied to the request.

25. A system according to claim 22, wherein: the at least one policy is applied to the request before the request is received by the target resource.

26. A system according to claim 13, further comprising: at least one resource operable to process a function for an evaluation delegated by one of the business process language and the rule set language.

27. A non-transitory computer program product embedded in a computer readable medium for applying a policy to a request, comprising:
computer program for acquiring a request by one of receiving and intercepting the request;
computer program for determining at least one policy to be applied to the request, the at least one policy including a plurality of conditions and a plurality of actions associated therewith;
computer program for, based at least in part on the plurality of conditions and the plurality of actions associated with the at least one policy, passing control of evaluation and enforcement of the at least one policy to an associated container, wherein the associated container comprises at least one of: a workflow engine, a rule set engine, or language engine; and
computer program for applying the at least one policy to the request using a common policy model framework implementing the associated container, wherein the common policy model framework is configured to handle the evaluation and the enforcement of the at least one policy across multiple disparate systems by implementing a common language comprising multiple languages, the common policy model framework further being configured such that a determination of an appropriate language and a setting of an appropriate context is done for each condition to be evaluated and each corresponding action to be executed in the at least one policy, the common policy model framework further providing for the passing of control and values at least one policy for evaluation of a condition and execution of a corresponding action to the determined language, the at least one policy operable to be applied to the request without evaluating each condition and executing each action contained therein,
wherein a combination of at least two of a business process language, a rule set language, and another programming language is used to apply the at least one policy.

28. A method of applying a policy to a request, comprising:
acquiring a request by one of receiving and intercepting the request;
determining at least one policy to be applied to the request, the at least one policy including a plurality of conditions and a plurality of actions associated therewith;
based at least in part on the plurality of conditions and the plurality of actions associated with the at least one policy, passing control of evaluation and enforcement of the at least one policy to an associated container, wherein the associated container comprises at least one of: a workflow engine, a rule set engine, or language engine; and
applying the at least one policy to the request by orchestrating a plurality of programming language engines executing the associated container, wherein the plurality of programming language engines are configured to handle the evaluation and the enforcement of the at least one policy across multiple disparate systems by combining the plurality of programming languages into a common programming language, such that a determination of an appropriate engine is done for each condition to be evaluated and each corresponding action to be executed in the at least one policy, the control and values at least one policy for evaluation of a condition and execution of a corresponding action being passed to the determined engine, the at least one policy operable to be applied to the request without evaluating each condition and executing each action contained therein,
wherein a combination of at least two of a business process engine, a rule set engine, and another programming language engine is used to apply the at least one policy.

\* \* \* \* \*

UNITED STATES PATENT AND TRADEMARK OFFICE
CERTIFICATE OF CORRECTION

| | | |
|---|---|---|
| PATENT NO. | : 8,141,125 B2 | Page 1 of 1 |
| APPLICATION NO. | : 11/565578 | |
| DATED | : March 20, 2012 | |
| INVENTOR(S) | : Maes | |

It is certified that error appears in the above-identified patent and that said Letters Patent is hereby corrected as shown below:

Title page, in column 2, under "Other Publications", line 1, delete "appliations" and insert -- applications --, therefor.

In column 1, line 58, delete "extensible" and insert -- eXtensible --, therefor.

In column 2, line 34, after "policies" insert -- . --.

In column 6, line 62, delete "Serivces" and insert -- Services --, therefor.

In column 13, line 3, delete "requester" and insert -- requestor --, therefor.

In column 13, line 24, delete "requester" and insert -- requestor --, therefor.

In column 13, line 48, delete "requester" and insert -- requestor --, therefor.

In column 13, line 51, delete "requester." and insert -- requestor. --, therefor.

Signed and Sealed this
Twelfth Day of June, 2012

David J. Kappos
*Director of the United States Patent and Trademark Office*